July 30, 1940.  J. F. LEVENTHAL  2,209,698
MOTION PICTURE APPARATUS
Filed May 19, 1938
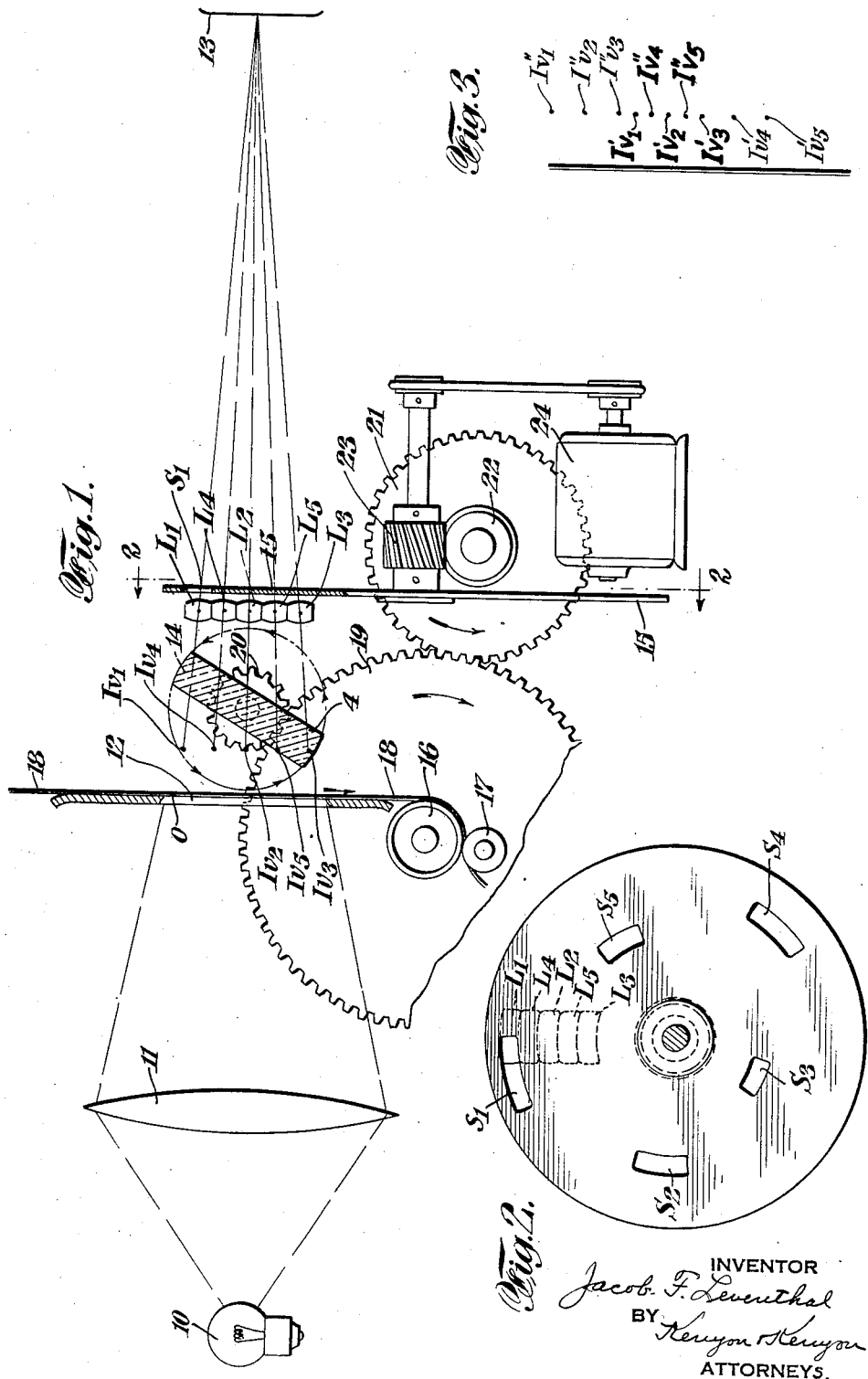
INVENTOR
Jacob F. Leventhal
BY Kenyon & Kenyon
ATTORNEYS.

Patented July 30, 1940

2,209,698

UNITED STATES PATENT OFFICE 2,209,698

MOTION PICTURE APPARATUS

Jacob F. Leventhal, New York, N. Y., assignor to Leventhal Patents, Inc., New York, N. Y., a corporation of Delaware Application May 19, 1938, Serial No. 208,740

8 Claims. (Cl. 88—16.8)

This invention relates to motion picture apparatus and more especially to an optical compensating system for producing stationary images of pictures on a film advanced at a uniform rate of speed.

In certain types of motion picture projection, such, for example, as projection of a motion picture image that is to be televised, a picture image frequency which is a multiple of 60 per second (the standard A. C. frequency) is necessary if objectionable effects are to be avoided. The standard motion picture frequency is 24 per second.

An object of this invention is an optical compensating system which is effective to produce a picture image frequency of 60 per second from a film uniformly advanced at the rate of 24 pictures per second.

According to this invention, the film is uniformly fed at the rate of 24 pictures per second and is optically compensated in stages in a manner similar to that disclosed in the U. S. patent to Jacob F. Leventhal, No. 1,974,573. The compensating arrangement is such that alternate pictures on the film are compensated two and three times respectively. Thus, of 24 pictures 12 will be compensated twice and 12 will be compensated thrice, thereby producing the desired frequency of 60 picture images per second. As the compensation cycles are of equal duration, it is evident that one picture will be exhibited for a longer time than its successor or vice versa.

Other objects, novel features and advantages of this invention will become apparent from the following specification and accompanying drawing, wherein:

Fig. 1 is a diagrammatic section of apparatus embodying the invention;

Fig. 2 is a section substantially on the line 2—2 of Fig. 1, and

Fig. 3 illustrates diagrammatically the various images produced by the compensator during two successive picture cycles.

In the drawing, 10 is a light source and 11 is a condenser lens associated therewith to direct light from the source through the film gate 12, bringing the light to focus on a screen 13 constituting part of a television transmitter which forms no part of the present invention and which is scanned at a frequency of 60 cycles per second. An optical compensator 14 consisting of a single glass plate is rotatably mounted just beyond the film gate and an obturator 15 is rotatably mounted in position to intercept the light beam between the compensator and the screen. A four picture sprocket 16 co-operates with a retaining roller 17 to draw a film 18 past the gate 12. The compensator speed is five times that of the sprocket 16 and this timing is maintained by the five to one gears 19 and 20 connected respectively to the sprocket 16 and the compensator 14. The shutter or obturator 15 rotates at twice the speed of the sprocket wheel 16 and this timing is maintained through the gear train 21, 22 and 23, the shaft for the gear 23 being driven by a motor 24 through suitable belt and pulleys. The compensator thus makes five revolutions for each four pictures and as each compensating stage requires one-half revolution, there are five compensating stages for two picture cycles or movement of the film a distance equal to two frames. Also, the obturator 15 makes one complete revolution for a series of five compensations. Between the compensator and the obturator are arranged a series of five lenses $L_1$, $L_4$, $L_2$, $L_5$ and $L_6$ in the direction of film travel and the obturator is provided with five slots $S_1$, $S_2$, $S_3$, $S_4$ and $S_5$ arranged at the proper radial distance to register respectively with the lenses $L_1$, $L_2$, $L_3$, $L_4$, $L_5$. Between successive slots are provided blank spaces which interrupt the passage of light to the screen 13.

The rotation of the compensator through 180° constitutes one compensation cycle. Compensation does not take place throughout the whole cycle but only for a selected portion starting with the compensator about as shown and ending when it has reached an equal and opposite angular position. The extent of the compensating period is determined by the length of the slots and the obturator interrupts the light over the remainder of the period.

The thickness of the compensator 14 and its index of refraction are such as to produce during compensation a stationary virtual image of the film picture. For simplicity's sake, merely a single point O will be considered, such point being the geometrical center of the picture.

During the movement of one picture through a distance equal to three compensating cycles, three virtual images $I'_{v_1}$, $I'_{v_2}$ and $I'_{v_3}$ will be produced and simultaneously with the production of each of these images, the slots $S_1$, $S_2$ and $S_3$ will register with the lenses $L_1$, $L_2$ and $L_3$ respectively, thus producing three successive registering images on the screen 13. During additional movement of the film through a distance equal to two more compensating cycles, additional virtual images $I_{v_4}$, $I_{v_5}$ will be formed, which, however, lie outside the projection field and so are not re-imageable as a practical matter on the screen. However, virtual images $I''_{v_4}$ and $I''_{v_5}$ are formed in the projection field of the corresponding point O on the succeeding picture and simultaneously with the production of these images, the slots $S_4$ and $S_5$ register with the lenses $L_4$ and $L_5$ to re-image said virtual images on the screen 13. Also during the first three compensating stages, the images $I''_{v_1}$, $I''_{v_2}$ and $I''_{v_3}$ of the center point O of the second picture are produced simultaneously with the images $I'_{v_1}$, $I'_{v_2}$ and $I'_{v_3}$ but lie outside the projection field and so are not re-imageable.

In Fig. 3, are indicated the relationships of the various images produced during two picture cycles. The usable images or those lying within the projection field are identified in heavy lines, while the non-usable images or those lying outside the projection field are identified by light lines. Since a picture image is produced on the screen 13 for each compensation stage, it is apparent that the above described arrangement will produce 60 images for each 24 film pictures and as the film is fed at the rate of 24 pictures per second, the frequency of the picture images produced on the screen 13 will be 60 per second.

In the case of standard film, the distance of two frame heights is 1.5 inches. The space between the virtual image points is .300 inch. Each virtual image point of one film has a counter part for the succeeding frame exactly .750 inch or one frame height away. Since the five compensations relate to two successive pictures, it is apparent that $I_{v_2}$ will lie on the optical axis with $I_{v_1}$ and $I_{v_3}$ symmetrical thereto, while the images $I'_{v_4}$ and $I'_{v_5}$ will be symmetrical with respect to the optical axis and alternate with the images $I_{v_1}$, $I_{v_2}$ and $I_{v_3}$ with the image points .150 inch apart.

While the invention has been specifically disclosed in an apparatus which produces five compensated stages for each two picture cycles, it is to be understood that the invention is also applicable to any apparatus in which there are 2N+1 compenstion stages for N picture cycles where N is in whole number greater than one.

I claim:

1. A motion picture apparatus comprising means for feeding framed motion picture film at uniform linear speed, a rotatable optical compensator operable to produce a stationary image of said film, means connecting said feeding means and compensator to effect, during movement of the film through N picture frames movement of the compensator through 2N+1 compensating cycles, whereby the geometrical center of one frame of the moving film is rendered optically conjugate successively with each of N+1 stationary spaced points in the direction of film travel and the geometrical center of the succeeding picture is rendered optically conjugate with each of two N stationary spaced points in the direction of film travel, 2N+1 lenses individually related to said spaced points and arranged to render optically conjugate said spaced points and a single stationary point, and means timed with the compensating means for rendering each lens effective only during its related compensating cycle.

2. A motion picture apparatus comprising means for feeding framed motion picture film at uniform linear speed, a rotatable optical compensator operable to produce a stationary image of said film, means connecting said feeding means and compensator to effect, during movement of the film through N picture frames movement of the compensator through 2N+1 compensating cycles, whereby the geometrical center of one frame of the moving film is rendered optically conjugate successively with each of N+1 stationary spaced points in the direction of film travel and the geometrical center of the succeeding picture is rendered optically conjugate with each of two N stationary spaced points in the direction of film travel, 2N+1 lenses individually related to said spaced points and arranged to render optically conjugate said spaced points and a single stationary point, and an obturator rotated at speed of one rotation for each picture cycle, said obturator having two N+1 light transmitting slots arranged to register one with each lens.

3. A motion picture apparatus comprising means for feeding framed motion picture film at uniform linear speed, a rotatable optical compensator operable to produce a stationary image of said film, means connecting said feeding means and compensator to effect, during movement of the film through two N picture frames movement of the compensator through five compensating cycles, whereby the geometrical center of one frame of the moving film is rendered optically conjugate successively with each of three stationary spaced points in the direction of film travel and the geometrical center of the succeeding picture is rendered optically conjugate with each of two stationary spaced points in the direction of film travel, five lenses individually related to said spaced points and arranged to render optically conjugate said spaced points and a single stationary point, and means timed with the compensating means for rendering each lens effective only during its related compensating cycle.

4. A motion picture apparatus comprising means for feeding framed motion picture film at uniform linear speed, a rotatable optical compensator operable to produce a stationary image of said film, means connecting said feeding means and compensator to effect, during movement of the film through two picture frames movement of the compensator through five compensating cycles, whereby the geometrical center of one frame of the moving film is rendered optically conjugate successively with each of three stationary spaced points in the direction of film travel and the geometrical center of the succeeding picture is rendered optically conjugate with each of two stationary spaced points in the direction of film travel, five lenses individually related to said spaced points and arranged to render optically conjugate said spaced points and a single stationary point, and an obturator rotated at speed of one rotation for each picture cycle, said obturator having five light transmitting slots arranged to register one with each lens.

5. A motion picture apparatus comprising means for feeding framed motion picture film at uniform linear speed, a rotatable optical compensator arranged and adapted upon movement through 2N+1 compensating cycles in timed relation with movement of the film through N picture frames to produce N+1 successive stationary spaced images of a picture and N successive stationary spaced images of succeeding pictures, 2N+1 imaging means for re-imaging said spaced images in registering alinement in a common image plane, each of said imaging means being individual to one of said spaced images, and means synchronized with said optical compensating means for rendering ineffective all but one of said imaging means during each compensation cycle.

6. A motion picture apparatus comprising means for feeding framed motion picture film at uniform linear speed, a rotatable optical compensator arranged and adapted upon movement through five compensating cycles in timed relation with movement of the film through two picture frames to produce three successive stationary spaced images of a picture and two successive stationary spaced images of the succeeding picture, five imaging means for re-imaging said spaced images in registering alinement in a common image plane, each of said imaging means being individual to one of said spaced images, and means synchronized with said optical compensating means for rendering ineffective all but one of said imaging means during each compensation cycle.

7. A motion picture apparatus comprising means for feeding framed motion picture film at uniform linear speed, a rotatable optical compensator arranged and adapted upon movement through $2N+1$ compensating cycles in timed relation with movement of the film through N picture frames to produce $N+1$ successive stationary spaced images of a picture and N successive stationary spaced images of succeeding pictures, $2N+1$ imaging means for re-imaging said spaced images in registering alinement in a common image plane, each of said imaging means being individual to one of said spaced images, and an obturator rotated once for each N picture cycle, said obturator having $2N+1$ angularly spaced slots at proper radial distances to register one slot with each imaging means.

8. A motion picture apparatus comprising means for feeding framed motion picture film at uniform linear speed, a rotatable optical compensator arranged and adapted upon movement through five compensating cycles in timed relation with movement of the film through two picture frames to produce three successive stationary spaced images of a picture and two successive stationary spaced images of the succeeding picture, five imaging means for re-imaging said spaced images in registering alinement in a common image plane, each of said imaging means being individual to one of said spaced images, and an obturator rotated once for each two picture cycles, said obturator having five angularly spaced slots at proper radial distances to register one slot with each imaging means.

JACOB F. LEVENTHAL.